United States Patent [19]

Meidan et al.

[11] Patent Number: 5,509,048
[45] Date of Patent: Apr. 16, 1996

[54] RADIO TRANSCEIVER WITH INTERFACE APPARATUS WHICH VISUALLY DISPLAYS INFORMATION AND METHOD THEREFOR

[76] Inventors: Reuven Meidan, 30 Zalman Shneior, Ramat Hasharon, Israel, 47239; Duane C. Rabe, 2702 Millstone, Rolling Meadows, Ill. 60008; Nathan Ariav, 4 Hagefen Street, Rishon Lezion, Israel, 75203; Hanan Achsaf, 16 Rachvat Ilan, Givat Shumel, Israel, 51905

[21] Appl. No.: 96,390

[22] Filed: Jul. 26, 1993

[51] Int. Cl.⁶ .................................................... H04Q 7/22
[52] U.S. Cl. .................... 379/58; 345/7; 455/89
[58] Field of Search .................. 379/58, 59, 63, 379/356, 355, 67, 88, 433, 434, 436, 428; 345/7; 455/90, 33.1, 54.1, 89; 353/13; 359/13, 630

[56] References Cited

U.S. PATENT DOCUMENTS

| | | | |
|---|---|---|---|
| 4,117,542 | 9/1978 | Klausner et al. | 379/444 |
| 4,644,351 | 2/1987 | Zabarsky et al. | 340/825.44 |
| 4,713,836 | 12/1987 | Suzuki | 379/58 |
| 4,818,048 | 4/1989 | Moss et al. | |
| 4,850,031 | 7/1989 | Allsop et al. | 455/90 |
| 4,852,146 | 7/1989 | Hathcock et al. | 379/63 |
| 4,881,258 | 11/1989 | Kaiwa et al. | 379/58 |
| 4,885,762 | 12/1989 | Suzuki et al. | 379/58 |
| 5,051,735 | 9/1991 | Furukawa | 345/7 |
| 5,148,473 | 9/1992 | Freeland et al. | 379/58 |
| 5,187,743 | 2/1993 | Gumb et al. | 379/436 |
| 5,212,721 | 5/1993 | DeLuca et al. | 379/57 |
| 5,216,705 | 6/1993 | Yoshida et al. | 379/355 |

FOREIGN PATENT DOCUMENTS

| | | | |
|---|---|---|---|
| 62-23266 | 1/1987 | Japan | 379/58 |

*Primary Examiner*—Curtis Kuntz
*Assistant Examiner*—William G. Trost
*Attorney, Agent, or Firm*—Kirk W. Dailey

[57] ABSTRACT

A mobile radiotelephone, and associated method, which facilitates usage thereof by a user while also operating an automotive vehicle. The radiotelephone includes a handset having actuation keys of unique geometries permitting the user to identify the keys by tactile rather than visual inspection. A visual-signal display assembly comprised of a heads-up display, including a screen element positionable at a front windshield assembly portion of an automotive vehicle, forms an output display of the radiotelephone, also to facilitate usage of the radiotelephone by a user while also operating the automotive vehicle.

24 Claims, 6 Drawing Sheets

RADIO TRANSCEIVER WITH INTERFACE APPARATUS WHICH VISUALLY DISPLAYS INFORMATION AND METHOD THEREFOR

BACKGROUND OF THE INVENTION

The present invention relates generally to radio transceivers and, more particularly, to a radiotelephone, and associated method, operable in a cellular communication system which includes interface apparatus which facilitates usage of the radiotelephone by a user while the user performs additional tasks, such as operating a motor vehicle.

A communication system is comprised, at a minimum, of a transmitter and a receiver interconnected by a communication channel. A radio communication system comprises one type of communication system wherein the communication channel interconnecting the transmitter and the receiver is formed of a radio frequency channel. No fixed connection is required between the transmitter and receiver of a radio communication system. Therefore, a radio communication system is advantageously utilized when a fixed connection between the transmitter and the receiver would be inconvenient or impractical.

A cellular communication system is one type of radio communication system. In a cellular communication system, numerous fixed-site transceivers, referred to as "base stations," are installed at spaced-apart locations throughout a geographical area. Each of the base stations contains circuitry to receive modulated signals transmitted thereto, and to transmit modulated signals therefrom. A radiotelephone transmits the modulated signals to a base station, and a base station transmits the modulated signals to the radiotelephone. The modulated signals are transmitted upon selected frequency channels allocated for such cellular communications.

A plurality of radiotelephones may be operated simultaneously when the modulated signals transmitted by the different radiotelephones are transmitted upon dissimilar channels. The dissimilar channels may be defined, e.g., to be of dissimilar frequencies or to be of dissimilar transmission the periods upon a single range of frequencies. (The modulated signals transmitted by base stations to the radiotelephone are similarly transmitted upon dissimilar channels.) As the power levels of the modulated signals generated by both the radiotelephones and the base stations are relatively low, the same frequency channel may be reused throughout a geographical area to transmit the modulated signals between a radiotelephone and a base station. In such manner, a cellular communication system efficiently utilizes the channels of the frequency band allocated for such use.

Technological improvements have decreased the cost associated with communication in a cellular communication system. As a result, ever-increasing numbers of users are able to made use of a cellular communication system to communicate thereupon. Of particular popularity is the use of a radiotelephone to communicate in a cellular communication system when the user is traveling in an automotive vehicle. Radiotelephones constructed for installation within an automotive vehicle are conventionally referred to as mobile phones. As no fixed connection is required between the radiotelephone and a base station, communication is permitted therebetween as long as the vehicle in which the radiotelephone is positioned is within the geographical area encompassed by the cellular communication system.

The steps required to be taken to effectuate a communication link between a radiotelephone, such as a mobile phone, and a base station are quite similar to the steps required to be taken to effectuate communication when utilizing a telephone of a conventional, wireline, telephonic system. Namely, a telephone number is entered by a user by way of a telephonic keypad. An additional key is also actuated to cause transmission of the telephone number to the base station. The telephone number is associated with a particular telephone situated at a remote location, and, once the telephone number is transmitted by the radiotelephone to a base station, effectuation of a communication link with the telephone situated at the remote location is accomplished in conventional manner.

Quite frequently, when the radiotelephone is positioned in an automotive vehicle, the user of the phone is also the operator of the vehicle. When operating the vehicle, primary attention must be directed to that task. Only minimal attention may be allocated to taking the steps required to effectuate communication in a cellular communication system. Although the required step of entering a telephone number is not, of itself, a complex task, visual inspection of the telephonic keypad is typically required of the user to ensure correct dialing of the telephone number. This visual inspection required to dial the telephone number detracts from the attention which must be directed to operating the automotive vehicle.

To minimize the visual inspection required to enter the telephone number, therefore, mobile phone constructions frequently include features to simplify the task of effectuating a communication link with a base station. For instance, the speaker and microphone, conventionally mounted upon a telephonic handset, are, in some mobile phone constructions, also fixedly mounted within the vehicular compartment of the automotive vehicle. Rather than holding a telephonic handset to position the speaker and microphone proximate to the user, the user may speak towards the microphone mounted in the fixed position in the vehicular compartment and listen to signals generated by the speaker similarly mounted in fixed position therein. Such feature is frequently referred to as a "hands-free" feature permitting "hands-free" operation of the mobile phone.

Additionally, existing mobile phone constructions frequently include features to reduce the number of steps necessary to dial a telephone number. Analogous to conventional, wireline telephonic constructions permitting "speed-dialing," mobile phone constructions include features permitting such dialing of a telephone number. Conventionally, a switch is associated with a single telephone number, and, when the switch is actuated, the telephone number associated therewith is dialed. When appropriately positioned in the vehicular compartment of the automotive vehicle, the operator of the automotive vehicle, upon memorizing the location of the switch, can dial the telephone number associated therewith by actuation of the switch.

However, as the switch is associated with a single telephone number (i.e., there is a one-to-one correspondence between the switch and the telephone number), an increase in the number of telephone numbers which may be "speed-dialed" requires a corresponding increase in the number of switches. The location of each switch must be memorized to avoid the requirement of a user to inspect visually the location of the switch prior to actuation thereof. With each additional switch, the likelihood that the user, either as an impulse or as of necessity, must visually inspect the location of the switch prior to actuation thereof increases, as the user must both memorize the locations of the switches and the telephone numbers associated therewith to actuate a switch without first making a visual inspection of the location thereof. As the attention of the operator of an automotive vehicle must be directed primarily to the operation of a vehicle, such a need or impulse to locate visually a switch prior to actuation thereof detracts from the operator's attention which should otherwise be directed towards operation of the automotive vehicle.

What is needed, therefore, is an improved radiotelephone, and interface apparatus therefor, which facilitates usage of the radiotelephone by a user.

SUMMARY OF THE INVENTION

The present invention, accordingly, provides a radio transceiver, and associated method, which overcomes the limitations associated with the existing art.

The present invention further advantageously provides a radiotelephone and an interface apparatus therefor which facilitates usage of the radiotelephone by a user while operating an automotive vehicle.

The present invention provides further advantages and features, the details of which will become more apparent by reading the detailed description of the preferred embodiments hereinbelow.

In accordance with the present invention, therefore, a radio transceiver, and associated method, operable by a user to communicate therethrough in a radio communication system is disclosed. The radio transceiver includes radio transceiver circuitry for generating modulated signals for transmission therefrom and for receiving modulated signals transmitted thereto. Control circuitry is coupled to the radio transceiver circuitry for generating control signals including control signals which control operation of the radio transceiver circuitry. At least one input actuation element coupled to the control circuitry permits the user to input control commands to operate the control circuitry and, in turn, the radio transceiver circuitry. A visual-signal display assembly is comprised of a projecting element coupled to receive control signals generated by the control circuitry and a screen element positioned beyond the projecting element for displaying visual signals projected thereupon by the projecting element.

BRIEF DESCRIPTION OF THE DRAWINGS

The present invention will be better understood when read in light of the accompanying drawings in which.

DESCRIPTION OF THE PREFERRED EMBODIMENTS

Figure 1:
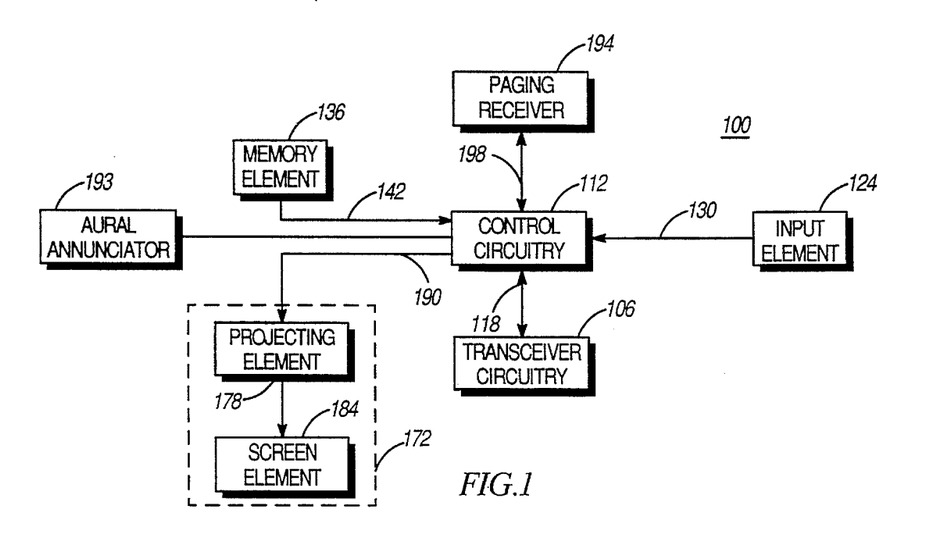
FIG. 1 is a block diagram of a radiotelephone comprising the radio transceiver of a preferred embodiment of the present invention.

Referring first now to the block diagram of FIG. 1, radiotelephone 100 comprising the radio transceiver of a preferred embodiment of the present invention is shown. Radiotelephone 100 includes transceiver circuitry 106 formed of a transmitter circuitry portion which generates modulated signals for transmission by the radiotelephone and a receiver circuitry portion for receiving signals transmitted to the radiotelephone.

Control circuitry 112 is coupled to transceiver circuitry 106 by way of line 118 and is operative to generate control signals on line 118 to control operation of the transmitter and receiver circuitry portions of transceiver circuitry 106. In the preferred embodiment of the present invention, control circuitry 112 is comprised of a processor-type device having software algorithms executable therein.

Input element 124 is coupled to control circuitry 112 by way of line 130. Input element 124 includes a telephonic keypad comprised of actuation switches as well as additional actuation switches which, upon actuation thereof, cause input signals to be applied to control circuitry 112.

Memory element 136 is also coupled to control circuitry 112, here by way of line 142, to permit transfer of data between control circuitry 112 and memory element 136.

Visual-signal display assembly 172, which includes projecting element 178 and screen element 184 is also connected to control circuitry 112, here by way of line 190. Control signals generated by control circuitry 112 cause projecting element 178 to generate visual signals which are displayed upon screen element 184. In a preferred embodiment, visual-signal display 172 comprises a heads-up display. Screen element 184 of assembly 172 is preferably transparent in appearance.

Aural annunciator 193 is also coupled to control circuitry 112. Control signals generated by control circuitry 112 cause annunciator 193 to generate aural signals.

Paging-receiver circuitry 194 forms a further portion of radiotelephone 100 of a preferred embodiment of the present invention. Paging-receiver circuitry is coupled to control circuitry 112 by way of line 198. Control circuitry 112 is further operative to generate control signals on line 198 to control operation of paging-receiver circuitry 194.

A user of radiotelephone 100 initiates effectuation of communication therethrough by actuating selected ones of the actuation keys of input element 124 to provide thereby inputs to control circuitry 112. Control circuitry 112 is operative to access, if necessary, data stored in memory element 136 and to cause operation of the transmitter and receiver circuit portions of transceiver circuitry 106. Control circuitry 112 is further operative to generate control signals on line 190, responsive to the input signals applied thereto on lines 118, 130, 142, or 198, to cause projecting element 184 of visual-signal display assembly 172 to generate visual signals for display upon screen element 178 of display assembly 172. Control circuitry 112 is also further operative, if desired, to generate control signals, also responsive to the input signals applied thereto on lines 118, 130, 142, or 198, to cause aural annunciator 193 to generate aural signals.

When a signal transmitted to transceiver circuitry 106 is received by the receiver circuitry portion thereof, an indication of such reception is provided by transceiver circuitry 106 to control circuitry 112 by way of line 118. Control circuitry 112, responsive thereto, generates signals on lines 118, 190, 193 and 198, as appropriate, to permit transceiver circuitry 106 to effectuate a two-way communication link with a remote site, to cause visual-signal display assembly 172 to generate a visual indication of the received signal, and to cause operation of paging-receiver circuitry 194, respectively.

When a signal transmitted to paging receiver circuitry 194 is received by such circuitry, an indication of such reception is provided by paging receiver circuitry 194 to control circuitry 112 by way of line 198. Control circuitry 112, responsive thereto, generates signals on lines 118, 142, 190, and 198, as appropriate to provide a user of radiotelephone 100 an indication of the received paging signal. In a preferred embodiment, when the paging receiver circuitry receives a signal transmitted thereto, and an indication of such reception is provided to control circuitry 112 by way of line 190, control circuitry generates a signal on line 190 to permit visual-signal display assembly 172 to display an indication of such reception upon screen element 184 thereof. Control circuitry 112 is also operative to access memory element 136 and to determine whether a telephone number forming a portion of a paging signal received by paging receiver circuitry 194 is also stored in memory element 136. If so, any information related to the telephone number (such as, and as shall be explained hereinbelow, mneumonic information related to the telephone number) is accessed by the control circuitry and thereafter also caused to be displayed upon screen element 184. Actuation by a user of actuation keys of input element 124 are further detected by control circuitry and, responsive thereto, the visual display upon screen element 184 is terminated.

The telephone number forming the portion of the paging signal received by paging receiver circuitry 194 may, of course, be supplied by control circuitry 112 to transceiver circuitry 106.

Figure 2:
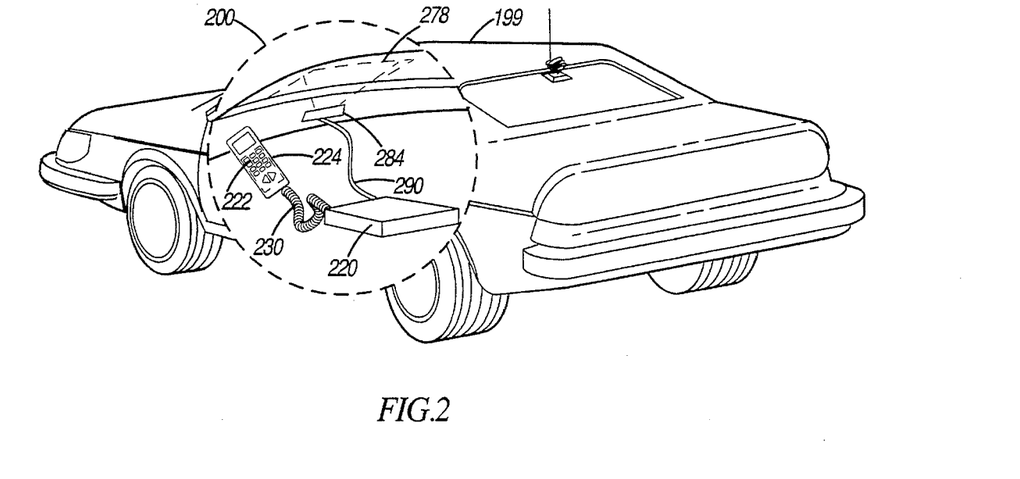
FIG. 2 is a partial block, partial schematic diagram of the radiotelephone, shown in block form in FIG. 1, positioned within the vehicular compartment of an automotive vehicle to permit operation of the radiotelephone by a user during operation of the automotive vehicle.

Turning next to the partial block, partial schematic diagram of FIG. 2, a portion of automotive vehicle 199 is shown. A radiotelephone, here referred to by reference numeral 200 and comprised of the elements contained within the rectangle shown in dash, is positioned within automotive vehicle 199. Circuitry portions of radiotelephone 200 analogous to transceiver and control circuitry 106 and 112 of radiotelephone 100 of FIG. 1 are housed within housing 220 which is supportively mounted within automotive vehicle 199. Radiotelephone 200 is further shown to include handset 222 upon which is positioned input element 224 comprised of a telephonic keypad and also additional actuation switches. Handset 222, and more particularly, the actuation switches of input element 224 positioned thereupon is connected to the circuitry housed within housing 220 by way of line 230.

Screen element 278 and projecting element 284 which together comprise a visual-signal display assembly analogous to display assembly 172 of radiotelephone 100, are further shown to form a portion of radiotelephone 200. Projecting element 284 is coupled to circuitry housed within housing 220 by way of line 290.

Screen element 278 is positioned at a windshield portion of vehicle 199, and, in one embodiment, actually comprises a portion of the windshield. As element 278 is transparent in appearance, element 278 does not interfere with the view of an operator of the vehicle. When the visual-signal display assembly comprises a heads-up display, and projecting element 284 is focused at an "infinity location," an operator of vehicle 199 may operate the vehicle and view information on the screen element 278 without refocusing.

A user of radiotelephone 200 initiates effectuation of telephonic communication by actuating desired ones of the actuation switches of input element 224 formed upon handset 222. Signals indicative of actuation of the desired switches is supplied to the circuitry of radiotelephone 200 housed within housing 220 by way of line 230. Control circuitry housed within housing 220 generates signals on line 290 to cause projecting element 284 to generate visual signals for display upon screen element 178. Visual signals displayed by projecting element 284 upon screen element 278 include visual signals which identify the status of the effectuation of a communication link with a remote site.

In a preferred embodiment of the present invention, a memory element, analogous to memory element 136 of radiotelephone 100 of FIG. 1, is housed within housing 220 to comprise an electronic directory for storing a series of telephone numbers which identify remote locations of a wireline telephonic network. Algorithms executable by a processing element comprising control circuitry analogous to control circuitry 112 of radiotelephone 100 is operative to access elements comprising telephone numbers stored within the electronic directory.

Such an electronic directory facilitates usage of radiotelephone 200 by permitting a user of the radiotelephone to initiate effectuation of a communication link with a remote site while requiring the user of the radiotelephone to actuate a smaller number of actuation keys of input element 224. In a preferred embodiment, three actuation switches, upon actuation thereof, cause control circuitry of radiotelephone 200 to access individual ones of the telephone numbers stored within the electronic directory.

Figure 3:
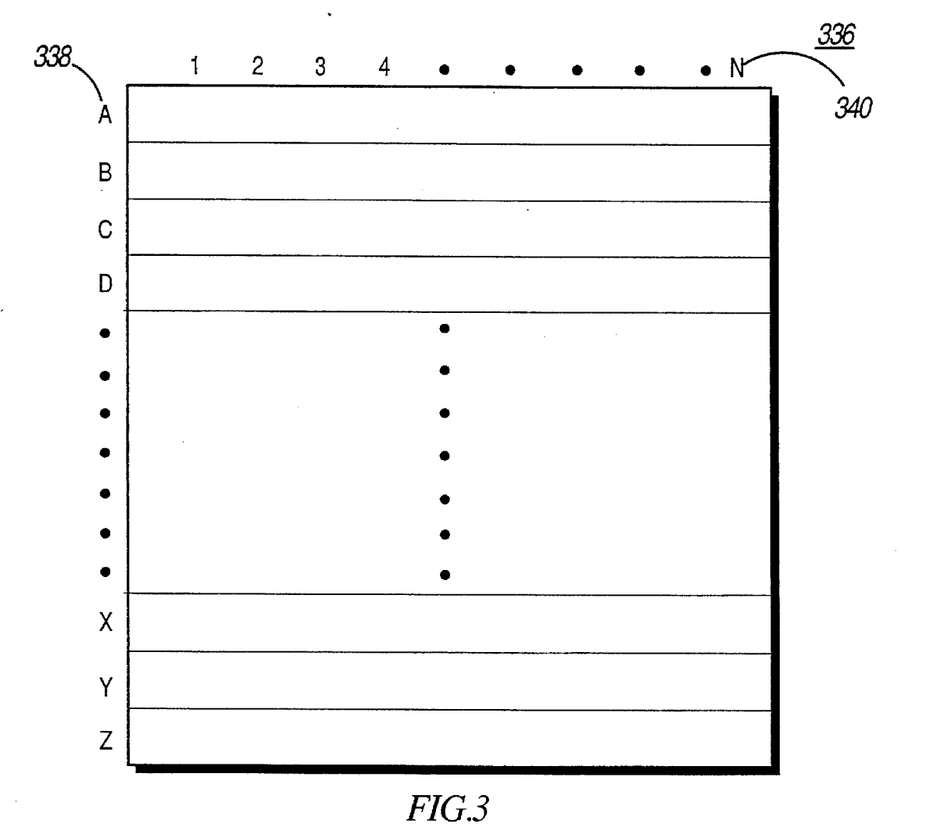
FIG. 3 is a representation of a memory element comprising a directory which forms a portion of the radiotelephone shown in the preceding figures.

FIG. 3 is a representation of a memory element comprising an electronic directory, referred to generally by reference numeral 336, of a preferred embodiment of the present invention. Directory 336 is represented by an array formed of columns and rows wherein rows define subdirectory locations 338 (identified by letters A, B, C, D, . . . , X, Y, Z) and columns 340 identify elements of individual ones of the subdirectory locations 338. The elements of each subdirectory location 338 comprise telephone numbers which identify remote locations of a telephonic network. Preferably, each element of the subdirectory location includes a nmeumonic identifier which identifies the telephone number associated therewith.

Figure 4:
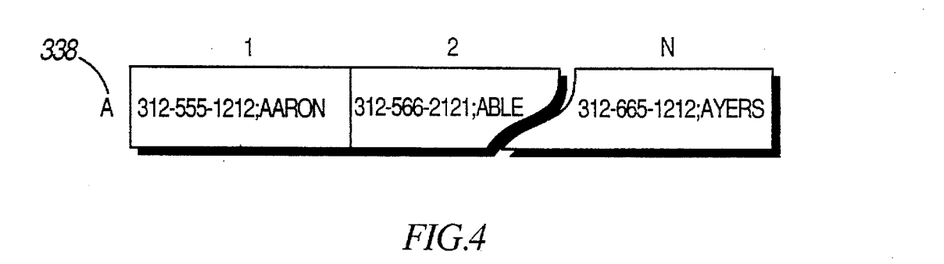
FIG. 4 is a representation of a single directory location of the directory represented in FIG. 3.

FIG. 4 is a representation of a single subdirectory 338 of directory 336 of FIG. 3. The illustrated subdirectory location corresponds to the subdirectory location 338 identified by letter A of FIG. 3. The subdirectory location is comprised of a plurality of elements, each shown to include a telephone number and a nmeumonic identifier associated therewith. When the algorithm executable by processing circuitry comprising the control circuitry of radiotelephones 200 and 100 of the preceding figures is executed, the contents of a selected element of subdirectory location 338 is accessed by the control circuitry. The accessed telephone number of the selected element is provided to the transceiver circuitry of the radiotelephone to be transmitted by the transmitter circuitry portion thereof, thereby to initiate effectuation of a communication link with a remote location identified by the accessed telephone number. The control circuitry of the radiotelephone further provides signals to the projecting element of the visual-signal display assembly of the radiotelephone which generates a visual signal of the accessed information upon a screen element. In such manner, a user of the radiotelephone is provided with a visual indication of the accessed telephone number and the nmeumonic identifier associated therewith.

Telephone numbers stored within individual ones of the elements of subdirectory location 338 in FIG. 4 are each associated with a nmeumonic identifier having a left-most letter A, here Aaron, Able, and Ayers. Other ones of the subdirectory locations 338 of directory 336 of FIG. 3 similarly include telephone numbers associated with nmeumonic identifiers having other common leftmost letters.

A user of radiotelephone 100 or 200, when desiring to initiate effectuation of a communication link with a remote location associated with a telephone number stored in directory 336, first accesses a desired subdirectory location 338 by actuating a first actuation key to sequence through the subdirectory locations 338 until a desired subdirectory location 338 is accessed. Then, a second actuation key is actuated to access individual ones of the elements of the selected subdirectory location. When a desired telephone number is accessed, the user of the radiotelephone actuates an additional key to cause transmission of the accessed telephone number to effectuate a communication link with a telephone associated therewith.

Because screen element 278 is positioned at a front windshield assembly of automotive vehicle 199, the user of radiotelephone 200, when positioned within automotive vehicle 199 is permitted to inspect visually the visual signal displayed upon the screen element 278 while operating the automotive vehicle 199 with little or no distraction. Elements of subdirectory locations 338 of directory 336 are visually displayed upon screen element 278 upon actuation by the user of radiotelephone 200 of the actuation keys which are operative to access the subdirectory locations 338 and individual elements thereof.

Figure 5:
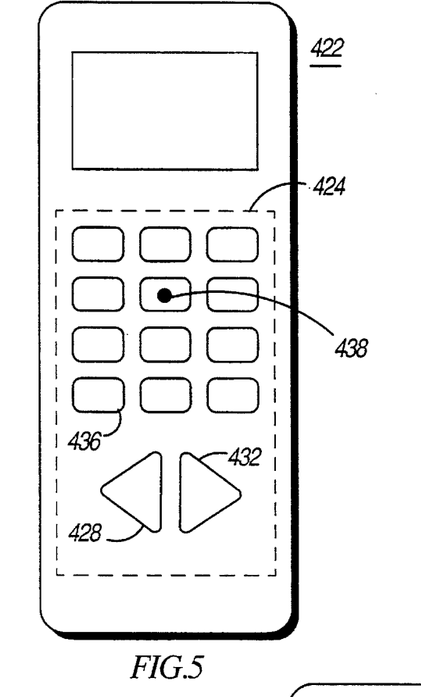
FIG. 5 is a plan view of a telephonic handset and a telephonic keypad forming a portion thereof according to a first preferred embodiment of the present invention.

FIG. 5 is a plan view of handset assembly 422 which corresponds to handset 222 of radiotelephone 200 of FIG. 2. As mentioned previously with respect to handset 222 of radiotelephone 200, an input element, here element 424 comprised of actuation keys contained within the rectangle shown in dash, permits a user to input information to the circuitry of the radiotelephone to cause operation thereof. Here, input element 424 is shown to be comprised of a top portion formed of a telephonic keypad and also, at a bottom portion thereof, actuation keys 428 and 432. Actuation keys 428 and 432, when actuated by a user, permits access to various of the subdirectory locations of an electronic memory forming a portion of a radiotelephone of the preferred embodiment of the present invention. With respect to directory 336 of FIG. 3, actuation of actuation key 432 causes an algorithm executable by circuitry of the radiotelephone including directory 336 to access successive ones of the subdirectory locations 338 in a consecutive manner. That is to say, successive actuation of actuation key 432 causes sequencing through successive ones of the subdirectory locations 338. And, conversely, actuation of actuation key 428 causes accessing of inconsecutive ones of the subdirectory locations 338. By appropriate actuation of actuation keys 428 and 432, a user of a radiotelephone including handset 422 may access a desired subdirectory location. Once a desired subdirectory location is accessed, a desired element thereof is accessed by actuation of another actuation key, here, for example, actuation key 436 of the telephonic keypad.

As illustrated, actuation keys 428 and 432 are of dissimilar geometric configurations. Such dissimilar geometric configurations, once known to a user, facilitate identification of the actuation keys by tactile sensing of the locations of such keys by the user. In such manner, a user of handset 422 may advantageously locate the position of keys 428 and 432 without the need to look at the handset 422. Thereby, use of handset 422 when the user thereof is also operating an automotive vehicle is facilitated as the user need not visually inspect the handset 422 prior to accessing elements of selected directory locations.

Raised button 438 is further formed upon the numeric "five" actuation key. Raised button 438 also facilitates location of the actuation keys of handset 422 without the need to inspect visually such keys.

Figure 6:
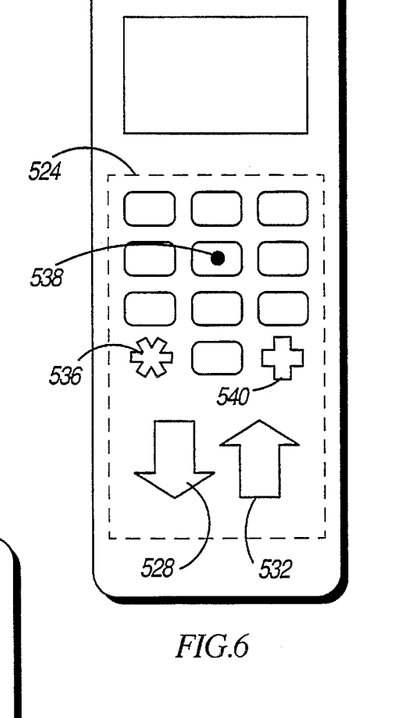
FIG. 6 is a plan view, similar to that of FIG. 5, but of a telephonic handset and telephonic keypad thereof according to an alternate, preferred embodiment of the present invention.

FIG. 6 is a plan view, similar to that of FIG. 4, but of a handset 522 of an alternate preferred embodiment of the present invention. Handset 522, similar to handset 422 of FIG. 4, includes an input element disposed thereupon, the input element here being referred to by reference numeral 524 and comprised of the actuation keys contained within the rectangle shown in dash. Actuation keys comprising input element 524 include a telephonic keypad as well as actuation keys 528 and 532. Actuation keys 528 and 532 are actuatable to perform functions analogous to the functions performed responsive to actuation of actuation keys 428 and 432 of handset 422 of FIG. 5. Also, actuation keys 528 and 532 are of dissimilar geometric configurations to facilitate tactile identification of such actuation keys by a user. Actuation keys 536 and 540 of input element 524 are also illustrated to be of unique geometric configurations which are different than the geometric configurations of the other actuation keys of the telephonic keypad of input element 524. Again, such unique geometric configuration facilitates tactile identification thereof by a user of bondset 522. Actuation key 536 is actuatable to perform a function similar to that of actuation key 436 of handset 422. Raised button 538 is further formed upon the numberic "five" actuation key and is similar to raised button 438 of FIG. 5.

Figure 7:
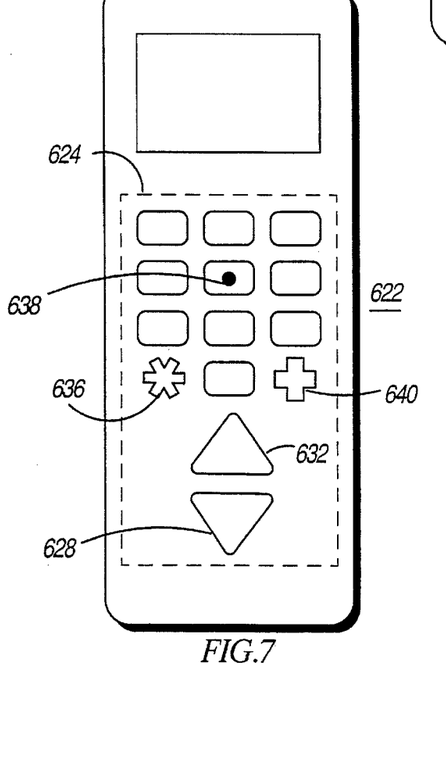
FIG. 7 is a plan view, similar to those of FIGS. 5 and 6, but of a telephonic handset and telephonic keypad thereof according to another alternate, preferred embodiment of the present invention.

FIG. 7 is a plan view, similar to those of FIGS. 5 and 6, but of handset 622, of another, alternate preferred embodiment of the present invention. Handset 622 includes input element 624 comprised of the actuation keys contained within the rectangle shown in dash in the figure. Input element 624 once again includes a telephonic keypad and additional actuation keys, here actuation keys 628 and 632. Actuation keys 628 and 632 are operative to perform functions similar to the functions performed upon actuation of actuation keys 428 and 432 and 528 and 532 of FIGS. 5 and 6. Actuation keys 628 and 632 are of dissimilar geometric configurations to permit tactile identification thereof by a user of handset 622. And, actuation keys 636 and 640 of the telephonic keypad are also of unique geometric configurations, thereby also to permit tactile identification thereof by a user of handset 622. Raised button 638 is further formed upon the numeric "five" actuation key and is similar to raised buttons 438 and 538 of FIGS. 5 and 6.

Figure 8:
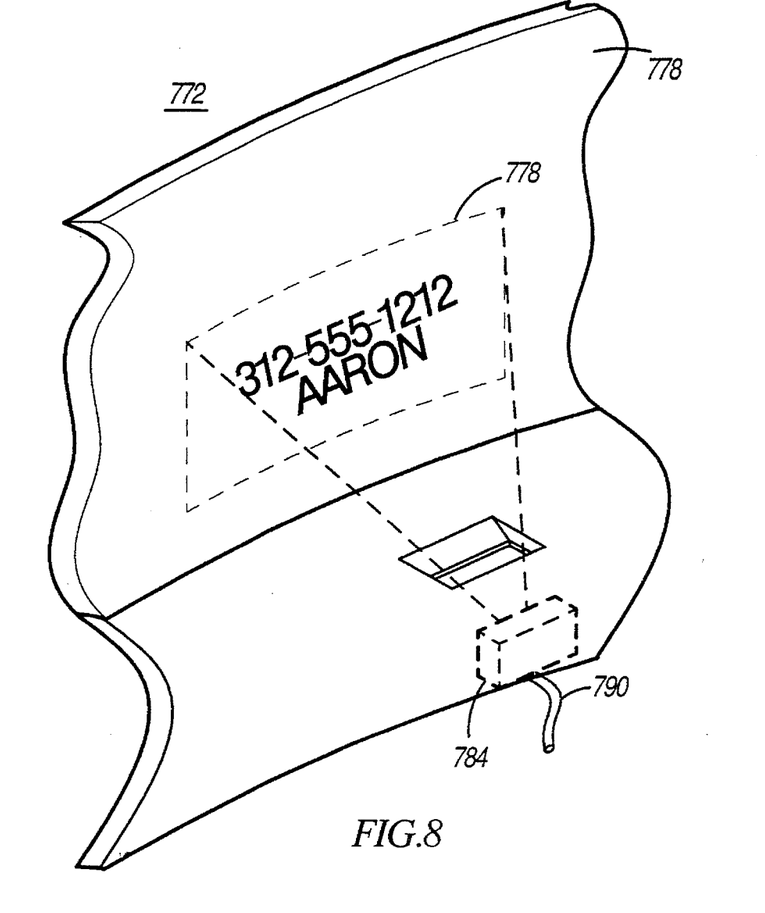
FIG. 8 is a partial block, partial schematic view of a visual-signal display assembly which forms a portion of the radiotelephone of the preferred embodiments of the preceding figures and a visual display generated thereby.

FIG. 8 is a partial block, partial schematic diagram of a visual-signal display assembly, here designated by reference numeral 772 and comprised of screen element 778 and projecting element 784. Screen element 778 is mounted at front windshield assembly portion 788 of an automotive vehicle.

Signals generated by control circuitry (not shown in the figure) are provided to projecting element 784 by way of line 790. Responsive to such control signals, projecting element 784 generates visual signals which are displayed upon screen element 778. Displayed upon screen element 778 of display assembly 772 are the contents of an element of a subdirectory location of an electronic directory such as directory 336 of FIG. 3.

Figure 9:
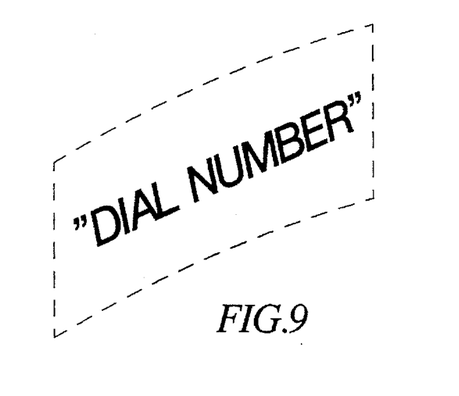
FIG. 9 is a partial block, partial schematic view of a visual display generated on a screen element of the visual-signal display assembly of FIG. 8.
Figure 10:
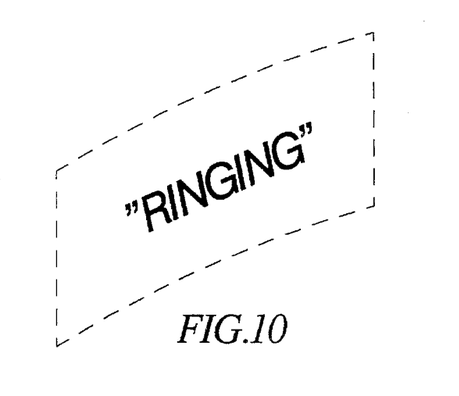
FIG. 10 is a partial block, partial schematic view, similar to that of FIG. 9, but of an alternate visual display generated on the screen element of the visual-signal display assembly of FIG. 8.

FIGS. 9 and 10 are partial block, partial schematic diagrams of screen element 778 which form portions of visual-signal display assembly of FIG. 8. In FIG. 9, the visual signal displayed upon screen element 778, "DIAL NUMBER", is representative of a visual-signal display generated responsive to actuation by the user of an actuation key of an input element of the radiotelephone. And, in FIG. 10, the visual signal displayed on upon screen element 778 is indicative of the status-indication of communication in a radio communication system during operation of a radiotelephone including screen element 778.

Figure 11:
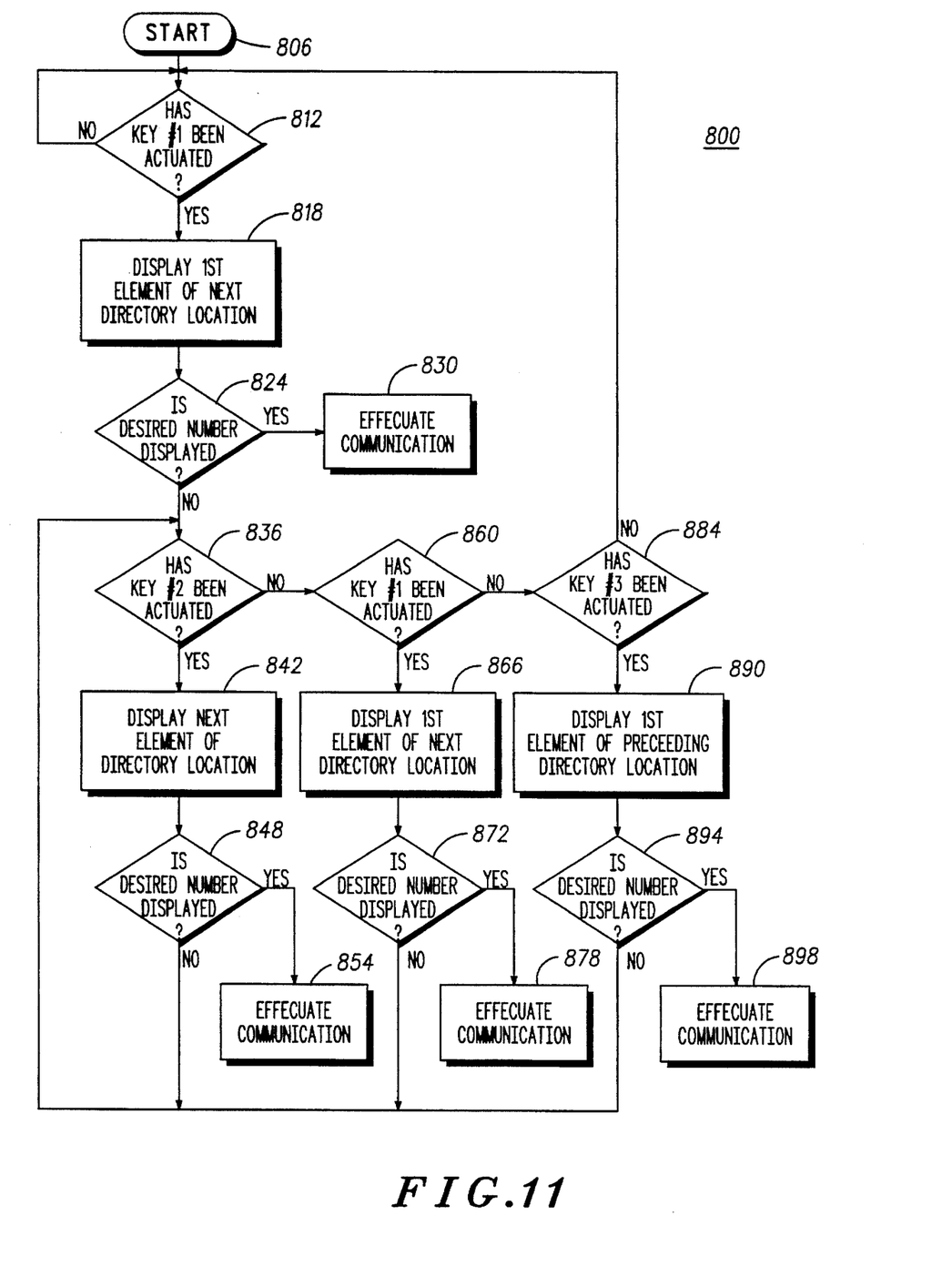
FIG. 11 is a logical flow diagram of an algorithm executable by processing circuitry which comprises the control circuitry of the radiotelephone of the preferred embodiments of the preceding figures.

FIG. 11 is a logical flow diagram of an algorithm, referred to generally by reference numeral 800, executed by processing circuitry which comprises the control circuitry such as control circuitry 112 of radiotelephone 100 of FIG. 1, of the preferred embodiments of the present invention.

After entering into the algorithm, represented by start block 806, a determination is made, as indicated by decision block 812 as to whether a first actuation key has been actuated. The first actuation key selects subdirectory locations of an electronic directory, such as subdirectory locations 338 of directory 336 of FIG. 3. If not, the no branch is taken, and the algorithm awaits actuation of such actuation key.

If the first actuation key has been actuated, the yes branch is taken to block 818 and the first element of a first, successive subdirectory location is displayed upon a screen element. Then, a determination is made, as indicated by decision block 824, as to whether the displayed element contains the telephone number of the desired location with which communication is to be effectuated. If so, the yes branch is taken, and as indicated by block 830, a communication link is effectuated with the remote site associated with the displayed telephone number.

If not, the no branch is taken to decision block 836 and a determination is made as to whether a second actuation key has been actuated. The second actuation key selects successive elements of a single directory location of the subdirectory location selected responsive to actuation of the first actuation key. With respect to handset 422 of FIG. 5, the second actuation key comprises actuation key 436.

If the second actuation key has been actuated, the yes branch is taken to block 842 and the next element of the subdirectory location is displayed. Then, at decision block 848, a determination is made as to whether the displayed element contains the telephone number at the desired location with which communication is to be effectuated. If so, the yes branch is taken, and, as indicated by block 852, a communication link is effectuated with the remote site associated with the displayed telephone number.

If not, the no branch is taken back to decision block 836.

If, at decision block 836, the second actuation key has not been actuated, the no branch is taken to decision block 860 whereat a determination is again made as to whether the first actuation key has been actuated. If so, a successive subdirectory location is accessed, and the first element of the accessed subdirectory location is displayed.

Thereafter, a determination is made, as indicated by decision block 872, as to whether the displayed element contains the telephone number of the desired location with which communication is to be effectuated. If so, the yes branch is taken, and as indicated by block 878, a communication link is effectuated with the remote site associated with the displayed telephone number. If not, the no branch is taken, and the algorithm loops back once again to decision block 836.

If a determination is made at decision block 860 that the first actuation key has not been actuated, the no branch is taken to decision block 884 whereat a determination is made as to whether a third actuation key has been actuated. Actuation of the third actuation key causes an inconsecutive one of the subdirectory locations to be accessed. With respect to handset 422 of FIG. 5, the third actuation key comprises actuation key 428. If the third actuation key has not been actuated, the no branch is taken and the algorithm moves back to decision block 812. If the third actuation key has been actuated, the yes branch is taken from decision block 884 and the first element of the preceding subdirectory location, as indicated by block 890, is displayed, Then, as indicated by decision block 894, a determination is made as to whether the displayed element displays the telephone number of the desired location with which communication is to be effectuated. If so, the yes branch is taken and, as indicated by block 898, a communication link is effectuated with the remote site associated with the displayed telephone number. If not, the no branch is taken to decision block 836.

Figure 12:
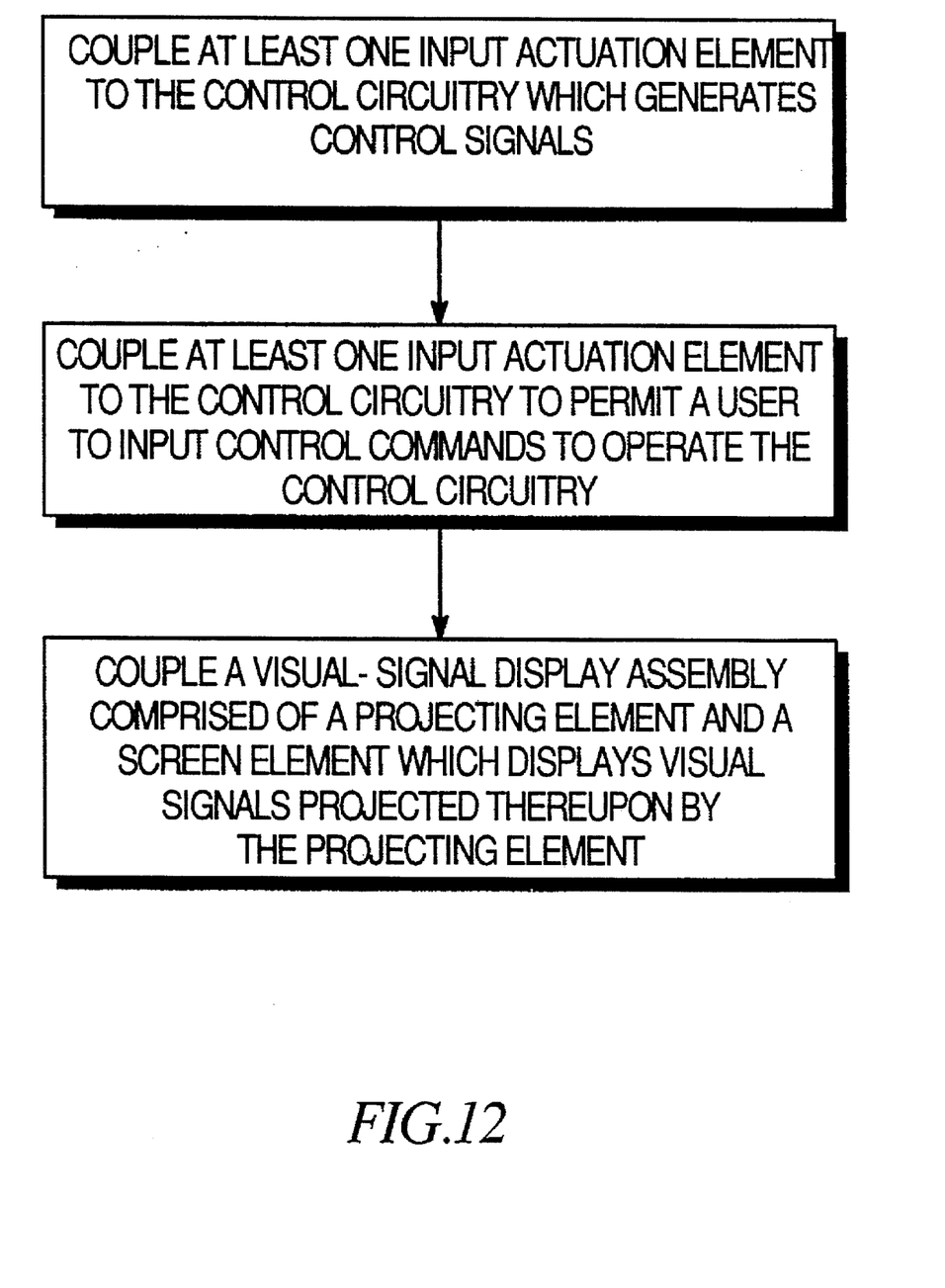
FIG. 12 is a flow diagram listing the method steps of the method of a preferred embodiment of the present invention.

Finally turning now to the logical flow diagram of FIG. 12, the method steps of the method, referred to generally by reference numeral 1000, of the preferred embodiment of the present invention are listed. Method 1000 is for a radiotelephone having radio transceiver circuitry operable by a user to communicate therethrough in a cellular communication system.

First, sad as indicated by block 1006, at least one input actuation element is coupled to the control circuitry to generate control signals including control signals to control operation of the radio transceiver circuitry.

Next, and as indicated by block 1012, at least one input actuation element is coupled to the control circuitry to permit the user to input control commands to operate the control circuitry and, in turn, the radio transceiver circuitry.

Finally, and as indicated by block 1018, a visual-signal display assembly comprised of a projecting element to receive control signals generated by the control circuitry and a screen element positioned beyond the projecting element for displaying visual signals projected thereupon by the projecting element is coupled to the control circuitry.

Because the handset upon which the input element of the radiotelephone of the preferred embodiments of the present invention includes actuation keys of dissimilarly-configured geometries, a user of the radiotelephone may identify the actuation keys by tactile sensing rather than requiring a visual inspection of the actuation keys, a user of a radiotelephone including such a handset may actuate desired actuation keys while operating an automotive vehicle. And, because a visual-signal display assembly including a screen element positioned at a front windshield assembly portion of an automotive vehicle displays information thereupon, the user of the radiotelephone may also visually inspect such display information with little distraction while also operating an automotive vehicle.

While the present invention has been described in connection with the preferred embodiment shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A radio transceiver operable by a user to communicate therethrough in a radio communication system, said radio transceiver comprising:

radio transceiver circuitry for generating modulated signals for transmission therefrom and for receiving modulated signals transmitted thereto;

paging receiver circuitry for receiving modulated signals transmitted thereto, the modulated signals representative of messages, including phone numbers;

control circuitry coupled to the radio transceiver circuitry and the paging receiver circuitry for generating control signals including control signals which control operation of the radio transceiver circuitry;

at least one input actuation element coupled to the control circuitry permitting the user to input control commands to operate the control circuitry, and in turn, the radio transceiver circuitry; and a visual-signal display assembly comprised of a projecting element coupled to receive control signals generated by the control circuitry and a screen element positioned beyond the projecting element for displaying visual signals projected thereupon by the projecting element, the visual-signal display assembly displaying the messages received by the paging receiver circuitry.

2. The radio transceiver of claim I wherein said radio transceiver circuitry comprises radiotelephone circuitry operable in a cellular communication system.

3. The radio transceiver of claim 2 further comprising a housing assembly for permitting supportive mounting of the radiotelephone circuitry, when housed therewithin, in a motor vehicle.

4. The radio transceiver of claim 2 further comprising a memory element coupled to the control circuitry.

5. The radio transceiver of claim 4 wherein said memory element forms a directory for storing in directory locations thereof sequences of digits forming telephone number.

6. The radio transceiver of claim 5 wherein the directory includes a plurality of subdirectory locations and at least some of the subdirectory locations include a set of telephone numbers.

7. The radio transceiver of claim 6 wherein each telephone number in the subdirectory has an associated mnemonic identifier.

8. The radio transceiver of claim 7 wherein the mnemonic identifiers associated with at least some of the telephone numbers comprise alphanumeric symbols.

9. The radio transceiver of claim 8 wherein the display includes a plurality of display locations, and the mnemonic identifiers associated with each of the telephone numbers of any subdirectory location that comprise the same first letter are displayed simultaneously.

10. The radio transceiver of claim 9 wherein said control circuitry comprises an algorithm embodied in a processor, said algorithm being operative to access directory locations and the sequences of digits stored therein comprising the telephone numbers.

11. The radio transceiver of claim 10 wherein said at least one input actuation element comprises a first switch and a second switch and wherein the algorithm embodied in the processor is operative to access successive ones of the directory locations of the directory responsive to actuation of the first switch and to access successive telephone numbers of a directory location selected thereby responsive to actuation of the second switch.

12. The radio transceiver of claim 11 wherein said at least one actuation element further comprises a third switch and wherein the algorithm embodied in the processor is further operative to access in consecutive ones of the directory locations of the directory.

13. The radio transceiver of claim 12 wherein the control signals generated by the control circuitry include control signals which cause the projecting element to project visual signals representative of the mneumonic identifier of a directory location accessed by the algorithm embodied in the processor.

14. The radio transceiver of claim 1 wherein said at least one input actuation element comprises a first key and a second key wherein the first key is of a first geometric configuration and the second key is of a second geometric configuration which is dissimilar to the first geometric configuration of the first key.

15. The radio transceiver of claim 3 wherein the screen element of said visually signal display is positioned on a front windshield.

16. The radio transceiver of claim 1 wherein the control signals generated by the control circuitry and applied to the projecting element of said visual-signal display are determined, at least in part, responsive to actuation by the user of the at least one actuation input.

17. The radio transceiver of claim 1 wherein the control signals generated by the control circuitry and applied to the projecting element of said visual-signal display causing display on the screen element of visual signals representative of status-indications of communication in the radio communication system.

18. The radio transceiver of claim 1 further comprising an aural annunciator coupled to receive control signals generated by the control circuitry, said aural annunciator for generating aural signals responsive to the control signals applied thereto by the control circuitry.

19. A radio telephone comprising:

a handset including an input element having actuation switches and circuitry positioned on the handset;

a housing including transceiver circuitry and paging receiver circuitry;

a line connecting the handset and the transceiver circuitry;

a projecting element for mounting in a vehicle and projecting an image, the image including paging receiver information;

a line connecting the projecting element to the transceiver circuitry such that the projecting element is remote from the housing and controlled by the transceiver circuitry;

a screen element for positioning at a windshield of a vehicle, the screen element to reflect the image projected by the projecting element; and wherein the input element provides a user with a tactile indication of the position of the user's hand on the input element without looking at the input element, the circuitry in the housing includes a signal source which communicates display information to the projecting element which emits information for reflection by the screen according to the operation of the input element, such that a user operates the radio telephone without looking directly at the radio telephone while driving.

20. A vehicle radio telephone operable by a vehicle operator to communicate through a radio telephone communication system, comprising:

a transceiver circuit for transmitting and receiving modulated signals;

a pager receiver circuit for receiving paging messages, the paging messages containing identifying information of a pager;

an operator actuated input device for inputting information, the operator actuated input device including a plurality of manually actuated keys and associated tactile identification such that the user can identify keys by touch;

a memory for storing control commands;

a visual signal display including a projecting element for projecting an information image and a screen element to reflect the information image projected by the projecting element at a remote location for viewing by the operator, the information image including at least the identifying information of the pager; and a control circuit coupled to the transceiver circuit, the pager receiver circuit, the input device, the memory, and the visual signal display, the control circuit responsive to control signals from the input device for generating control signals including control signals controlling operation of the transceiver circuit, the control circuit responsive to signals input by the input device to select control commands stored in the memory, and the control circuit controlling the projector to project information from the memory onto the screen such that the user controls operation of the transceiver using the input device and confirm the input operation by viewing the screen while operating the vehicle, the operation of the transceiver including placing a call to a location identified by the identifying information received by the pager receiver information.

21. The vehicle radio telephone as defined in claim 20 wherein the input device includes a plurality of keys for entering information directly and control keys for controlling access to information stored in the memory.

22. The transceiver as defined in claim 19, wherein the screen comprises a transparent element adapted to be mounted to a vehicle window in the operator's line of sight.

23. The transceiver as defined in claim 20, wherein the control circuit is responsive to reception of a paging signal to control the projector to project paging messages to the screen.

24. The transceiver as defined in claim 21, wherein the transceiver circuitry includes cellular radiotelephone transceiver, and the input device includes a telephone handset keypad.

* * * * *